Figure 1:
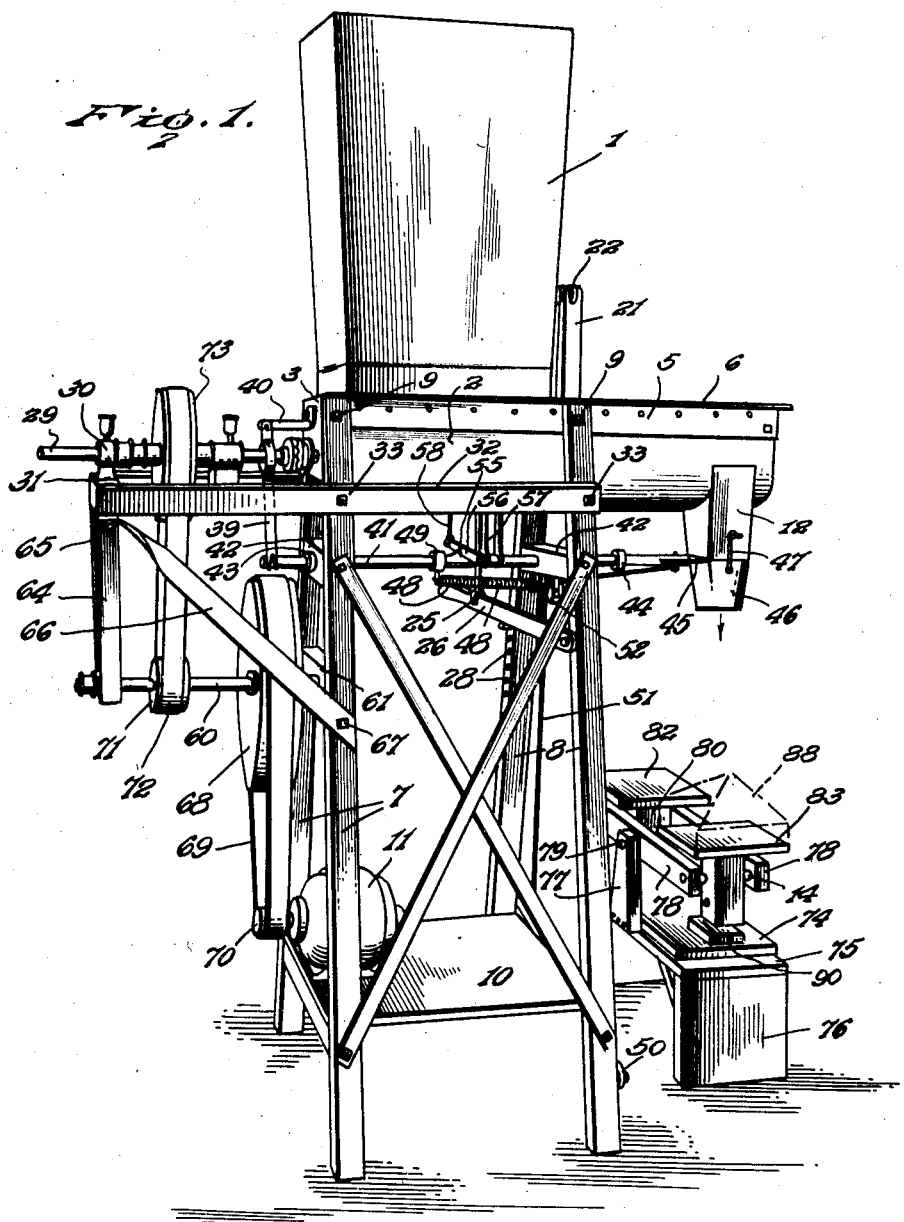

Oct. 21, 1941.  H. NEILL  2,260,087
SACK FILLING AND WEIGHING MACHINE
Filed Jan. 16, 1939   4 Sheets-Sheet 1

Inventor
Harvey Neill.
By Lacey & Lacey, Attorneys

Oct. 21, 1941.    H. NEILL    2,260,087
SACK FILLING AND WEIGHING MACHINE
Filed Jan. 16, 1939    4 Sheets-Sheet 2
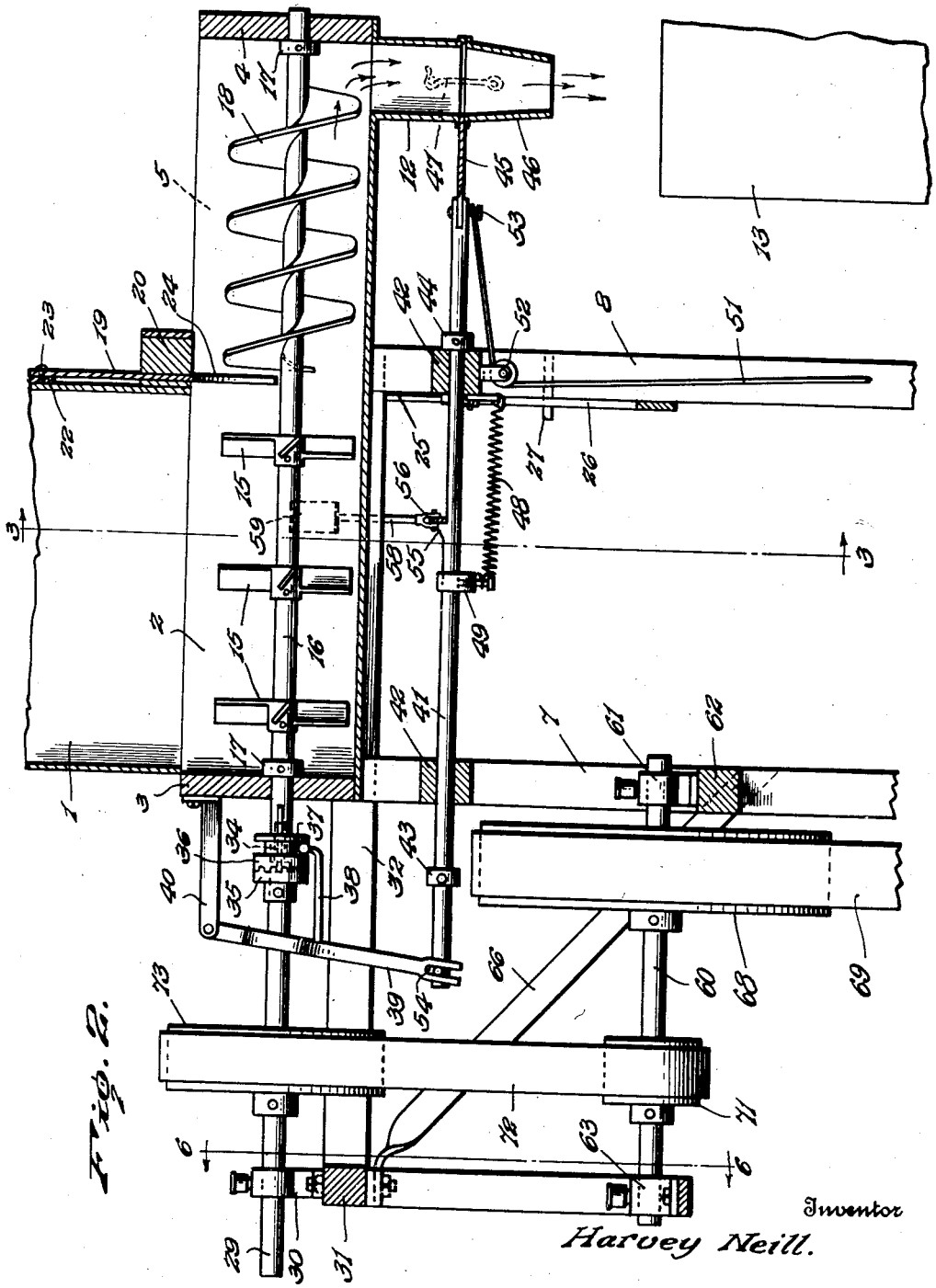
Inventor
Harvey Neill.
By
Lacey & Lacey
Attorneys

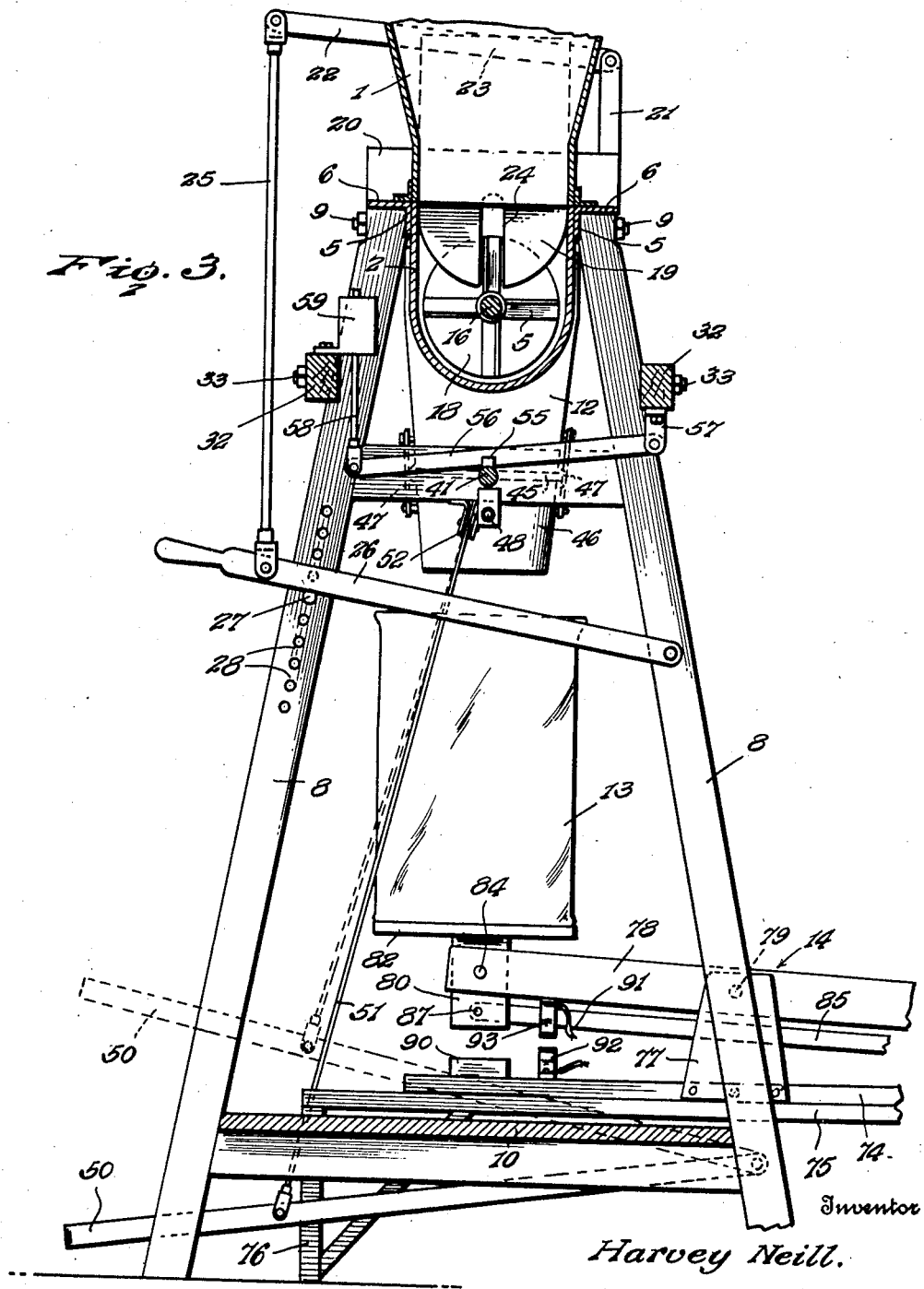

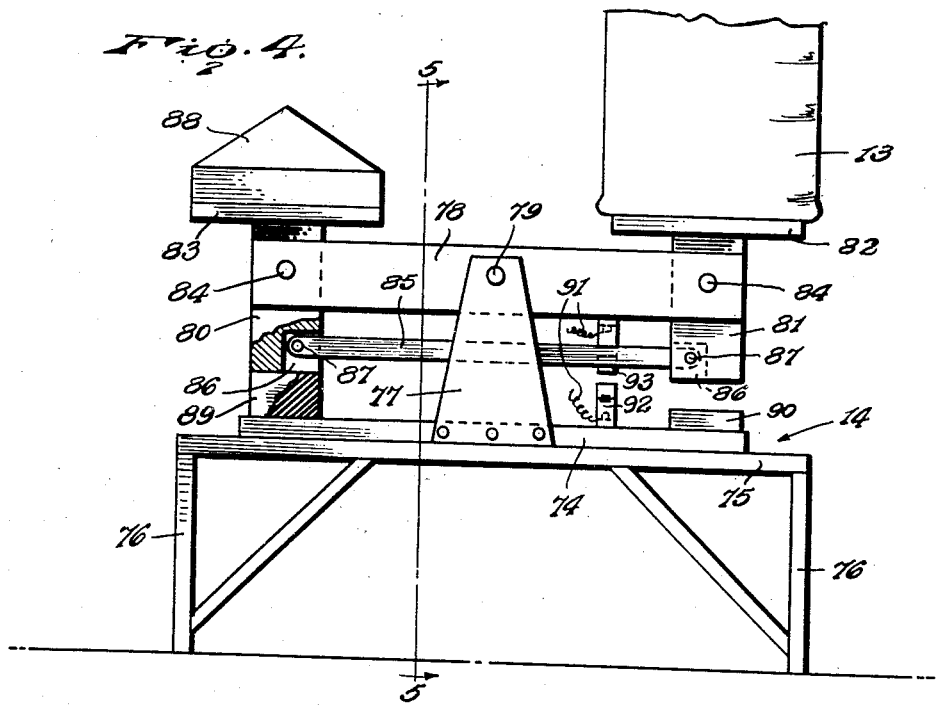

Patented Oct. 21, 1941

2,260,087

UNITED STATES PATENT OFFICE 2,260,087

SACK FILLING AND WEIGHING MACHINE

Harvey Neill, Fort Valley, Ga., assignor to A. O. Bray Company, Griffin, Ga.

Application January 16, 1939, Serial No. 251,228

1 Claim. (Cl. 249—61)

This invention relates to a sack filling and weighing machine, and it is one object of the invention to provide a device of this character by means of which grain, meal, sugar, or any other free running material may be delivered into a sack until the sack has been filled with a predetermined quantity of the material by weight, the feeding mechanism being then shut off and delivery of the material therefrom stopped until the filled sack has been removed and an empty sack set in place.

It is another object of the invention to provide a sack filling and weighing machine including a hopper having a trough leading from its bottom, a shaft being rotatably mounted in the trough and carrying agitating means for breaking up any of the material which may have formed into cake and also carrying a screw conveyor for delivering the material to a spout through which it passes downwardly into the sack, manually operated means being provided for shifting a clutch member into position to cause rotary motion to be transmitted to the shaft carrying the agitators and the screw conveyor and there also being provided a latch for holding the clutch in its operative position having a solenoid for drawing the latch to a releasing position when a circuit for the solenoid is closed by movement of a scale beam when a predetermined quantity of the material is in the sack.

Another object of the invention is to provide a sack filling and weighing machine wherein the agitator blades carried by the rotary shaft in the discharge trough are so formed that the material passing from the hopper into the trough will be very effectively operated upon and lumps or caked portions thereof so broken up that it may be easily moved through the trough by the screw conveyor.

Another object of the invention is to provide the sack filling and weighing machine with means for controlling flow of the material from the portion of the trough under the hopper into the portion of the trough projecting from the hopper and having the screw conveyor therein. It will thus be seen that the speed at which the material is delivered from the portion of the trough having the agitators therein into that portion of the trough having the conveyor operating therein may be controlled.

Another object of the invention is to provide the sack filling and weighing machine with a scale so formed that a sack may be set in an upright position over one end of a rocker bar counter-balanced at its other end by a weight of predetermined size, the rocker bar carrying a contact for engaging a companion contact upon the base of the scale when the weight of the material delivered into the bags causes tilting of the rocker bar. It will thus be seen that, when a predetermined quantity of material by weight has been delivered into the bags, the movable contact carried by the rocker bar will be brought into engagement with the companion stationary contact and a solenoid or electro-magnet energized to move a latch to a releasing position and cause a clutch for the rotary shaft to be moved to an inoperative position and a gate for the delivery spout of the trough to be closed.

Another object of the invention is to provide a machine of this character which is of simple and sturdy construction and very easy to operate.

The invention is illustrated in the accompanying drawings, wherein:

Figure 1 is a perspective view of the improved sack filling and weighing machine, Figure 2 is a view showing the machine partially in vertical longitudinal section and partially in elevation, Figure 3 is a view taken along the line 3—3 of Figure 2, Figure 4 is a view showing the scale in front elevation, Figure 5 is a sectional view taken along the line 5—5 of Figure 4, and Figure 6 is a fragmentary sectional view taken along the line 6—6 of Figure 2.

This improved sack filling and weighing machine has a hopper 1 which is open at its top and may be filled from an overhead bin or have the material poured into it through its open upper end. This hopper is mounted over one end portion of a trough 2 extending horizontally and projecting from the front of the hopper, as shown in Figures 1 and 2. While the hopper has been shown mounted over the trough for approximately half the length thereof, it is to be understood that the trough may be of any length desired and project from the hopper a proportionately greater or less distance if so desired. Heads 3 and 4, which may be formed of wood, are provided for ends of the trough and side portions of the trough are reinforced by strips 5 which are formed of angle metal and have upper flanges projecting from opposite sides of the trough, as shown in Figures 1 and 3. These flanges 6 rest upon the upper ends of supporting legs 7 and 8 which are secured by bolts 9, and upon referring to Figures 1 and 3, it will be seen that the legs diverge downwardly, and between their lower portions carry a platform 10 upon which an electric motor 11 is mounted. The trough and the hopper will, therefore, be well supported in an elevated position in which the material may be passed from the hopper through the trough to the outer or front end thereof where it will flow downwardly through the delivery spout 12 and into a sack 13 set in place upon the scales, indicated in general by the numeral 14.

The material in the hopper 1 gravitates toward this lower end and into the portion of the trough over which the hopper is disposed, and in order to break up any cakes or lumped material, there has been provided agitating means consisting of blades 15 which are secured upon a shaft 16 extending longitudinally in the trough with its end portion journaled through the heads 3 and 4 and carrying abutment collars 17 to prevent longitudinal shifting of the shaft in the trough. The blades 15 are spaced from each other longitudinally of the shaft and are so pitched that a very good turning motion will be imparted to the material in the portion of the trough over which the hopper is disposed and all lumps or cakes which may have formed broken up before the material passes into the portion of the trough projecting forwardly from the hopper. In this forwardly projecting portion of the trough, the shaft carries a spirally extending screw conveyor 18, and from an inspection of Figure 2, it will be readily understood that this screw conveyor will move the material forwardly in the trough and deliver the material into the upper end of the spout 12 through which the material flows and is delivered therefrom into the sack 13.

It is desirable to control the flow of the material from the portion of the trough under the hopper into the forwardly projecting portion thereof in which the screw conveyor operates. In order to do so, there has been provided a gate 19 which is preferably formed of sheet metal and extends vertically and transversely across the trough at the front of the hopper. A cross bar 20 extends across the trough at the front of the hopper to serve as a guide for the gate, and to this cross bar is mounted an upright arm or standard 21, to the upper end of which is pivoted a lever 22. The upper end of the gate is connected with the lever by a fastener 23 so that, when the lever is swung vertically, the gate will be vertically adjusted and moved into position to block the trough between the hopper and the screw conveyor to a predetermined extent. A slot 24 to receive the shaft 16 is formed in the lower end portion of the gate in order to prevent interference with movement of the gate by the shaft 16 when the gate is shifted downwardly. A link 25 connects the free end of the lever 22 with a lever 26 which is pivoted to one of the legs 8, and from an inspection of Figure 3, it will be readily understood that by grasping the free end of the lever 26 and swinging this lever upwardly, the gate may be shifted upwardly from a position in complete blocking relation to the trough to a raised position where it will be maintained when a pin 27 is thrust into one of the openings 28 formed in the leg 8 across which the free end portion of the lever 26 passes. If it is found that the material is feeding too freely or not freely enough, it is merely necessary to remove the pin 27 and shift the lever 26 vertically to properly adjust the gate and then fit the pin into another one of the openings where it will maintain the lever and the gate in the adjusted position.

The shaft 16 of the agitating and conveying means receives its rotary motion from a shaft 29 rotatably mounted through a bearing 30 carried by a cross bar 31 mounted between the rear ends of supporting beams 32 which extend horizontally longitudinally of the trough and are secured to the legs 7 and 8 by bolts or equivalent fasteners 33. The abutting ends of the shafts 16 and 29 are held in alinement with each other by a core 34, and the shaft 29 carries a rigidly secured clutch member 35 for engagement by a shiftable clutch member 36 keyed to the shaft 16 so that it will turn with the shaft 16 but may be shifted longitudinally thereof into and out of clutching engagement with the clutch member 35. The shiftable clutch member is formed with a circumferentially extending groove 37 in which engages the forward end of a fork or arm 38 extending from a clutch operating lever 39. This clutch operating lever extends vertically with its upper end pivoted to a mounting bracket 40 carried by the head 3 of the trough, and the lower end of the clutch operating lever is pivoted to a rod 41 which extends longitudinally of the trough under the same and is slidably mounted through cross bars 42 carried by the legs 7 and 8 near their upper ends. Sliding movement of this rod is limited by the collars 43 and 44, and at its front end the rod is secured to a gate 45 which is slidably mounted for movement transversely of the spout 12 into and out of blocking relation thereto. The lower portion or throat 46 of the spout is removably secured by hooks 47 in order that this lower portion of the spout may be removed when inserting the gate. A spring 48 which extends longitudinally of the rod 41 and is secured at one end to a block 49 carried thereby urges the rod and the gate forwardly to dispose the gate in closing relation to the spout, and in order that the rod and gate may be shifted rearwardly to open the gate, there has been provided a foot operated pedal 50 which is pivoted at one end to one of the forward legs 8 near the lower end thereof and in spaced relation to its free end has one end of a rope or wire cable 51 secured to it. This rope or cable which constitutes a pull line is trained about the pulley 52 and then extended forwardly with its front end secured to the hook 53 depending from the front end of the rod 41. It will thus be seen that, when pressure is applied to the treadle or pedal 50, pull will be exerted upon the line 51 and the rod 41 shifted rearwardly to draw the gate 45 to the open position shown in Figure 2. At the same time the lever 39 which is connected with the rear end of the rod 41 as shown at 54 will be swung rearwardly and the clutch member 36 shifted into clutching engagement with the companion clutch member 35 and rotary motion will be transmitted to the shaft 16 so that the agitators 15 will be set in motion and the screw conveyor 18 operated to move the material forwardly in the trough to the front end thereof where it will pour downwardly through the spout 12 and into the sack to be filled. A tooth 55 for engagement by a latching bar extends upwardly from the rod 41, and when the rod is shifted rearwardly, this tooth will move under the latching bar or keeper 56 and engage the same, as shown in Figure 2, so that forward movement of the rod will be prevented as long as the keeper or latching bar remains in its operative position. This latching bar or keeper extends transversely of the supporting frame with one end pivoted to a bracket 57 carried by one of the bars 32 and its other end pivoted to the lower end of the core 58 of a solenoid 59 carried by the bar 32 at the other side of the frame. When the solenoid is energized, the metal rod which constitutes its core 58 will be drawn upwardly to swing the latch bar or keeper upwardly and the rod 41 will be released so that the spring 48 may draw the rod 41 forwardly and move the gate 45 into its closed position across the spout 12 while at the same time shifting the clutch member 36 forwardly to release the shaft 16 from the rotary shaft 29. It will thus be seen that the agitating and feeding mechanism in the trough will be set in motion whenever the rod 41 is shifted rearwardly to open the gate 45, and when this gate is closed, feeding of the material through the trough will be stopped.

Rotary motion is transmitted to the shaft 29 from the electric motor 11, and in order to do so, there has been provided a counter-shaft 60 which extends longitudinally of the shaft 29 below the bars 32 of the frame. This shaft has its forward end rotatably mounted in a bearing 61 carried by a cross bar 62 secured between the legs 7 and its outer end portion is rotatably mounted in a bearing 63 carried by a yoke 64 which is U-shaped and has the upper ends of its arms secured against under faces of the bars 32. The bolts 65 which secure upper ends of the yoke arms to the side bars 32 also serve as means for securing the rear ends of the bracing strips 66 extending diagonally between rear ends of the bars 32 and the rear legs 7, against which they are secured by the fasteners 67. The counter-shaft 60 carries a large pulley 68 above which is engaged a belt 69 having its lower portion trained about the small pulley 70 mounted upon the shaft of the motor 11, and when the motor is in operation, rotary motion will be transmitted from the shaft of the motor to the counter-shaft 60 at a greatly reduced speed. The counter-shaft also carries a small pulley 71 engaged by a belt 72 which extends upwardly and is trained about a larger pulley 73 carried by the shaft 29. This will cause a further reduction in speed at which rotary motion is transmitted from the counter-shaft 60 to the shaft 29, and when the clutch member 36 is in engagement with the clutch member 35, rotary motion will be transmitted to the shaft 16 at the proper speed for operation of the agitating means and the screw conveyor carried by the shaft 16.

The scale 14 upon which the sack 13 is placed is disposed in front of the frame under the spout 12 and has a base 74 resting upon a bench or support 75 which is of a suitable length and width and provided with end supports 76. Standards 77 rise from the base 74 midway the length thereof, and between these standards are pivotally mounted scale beams or bars 78 which are adapted to tilt about the rod 79 by means of which they are pivotally mounted. Blocks 80 and 81 carrying platforms 82 and 83 are mounted between ends of the scale beams 78 by rods 84, and in order to maintain the blocks in an upright vertical position, there has been provided a tie rod 85 extending between lower end portions of the blocks with its ends fitting into pockets 86 formed at lower ends of the blocks and pivotally mounted by pins 87. When the bench is in its proper position in front of the frame of the machine, the platform 82 is disposed under the spout 12 so that, when the sack 13 is set upon this platform, it will be directly under the spout and the bag will be filled with material flowing from the spout. The other platform 83 carries the weight 88 which will be of the proper size to prevent the scale beams from being rocked about the pivot pin 79 until the sack is filled with the proper quantity of material. Cushioning blocks 89 and 90 are provided at ends of the base 74 to limit downward movement of the blocks 80 and 81 and serve as shock absorbers to cushion their downward movement. Conductors 91 which lead from opposite ends of the solenoid and from a suitable source of power are connected to contacts 92 and 93 carried by the base 74 and one of the scale beams 78, and from an inspection of Figures 4 and 5, it will be readily seen that, when the weight of the material in the sack is sufficient to cause the platform 82 and the block 81 to be moved downwardly, the contact 93 will engage the stationary contact 92 to close the circuit through the solenoid to cause the latching bar or keeper 56 to be swung upwardly out of engagement with the tooth 55 and release the rod 41 so that the spring 48 may shift this rod forwardly and move the gate 45 into closing relation to the spout 12. Flow of material through the spout will thus be cut off and at the same time the clutch member 36 will be moved out of engagement with the companion clutch member 35 and rotation of the shaft 16 carrying the agitators and the screw conveyor will stop. The filled sack may then be removed from the platform 82 and an empty sack set in its place thereon, after which the operator of the machine will step upon the pedal 50 to draw the rod 41 rearwardly and again move the clutch 36 into engagement with the clutch member 35 so that the shaft 16 will be rotated and the material fed from the hopper to the spout of the trough. It will thus be seen that the sack filling and weighing machine is so constructed that after a sack has been placed upon the scales the gate 45 may be opened and the shaft 16 rotated to agitate material in the trough under the hopper and the screw conveyor turned with the shaft to feed the material through the hopper and downwardly through the spout until the proper quantity of material has been delivered into the sack at which time the latch bar will be automatically moved to release the rod 41 and cut off flow of material through the spout until another sack has been placed upon the scale platform 82 in place of the filled sack.

Having thus described the invention, what is claimed as new is:

A filling and weighing machine comprising a support, a trough carried by said support and projecting forwardly therefrom, a spout for said trough at the outer front end thereof, a hopper over the portion of the trough carried by said support, a scale in front of said support for holding a receptacle under said spout, a shaft extending longitudinally in said trough and rotatably mounted with its rear portion projecting from the trough, a conveyor carried by said shaft for moving material forwardly through the trough and delivering the same to said spout, a drive shaft rotatably mounted in alinement with said shaft rearwardly thereof, a clutch having a stationary member and a movable member shiftable into position to engage the stationary clutch member and cause turning of the conveyor shaft with the drive shaft, a bracket extending rearwardly from said trough, a lever pivoted at one end to said bracket, an arm extending from said lever end engaging the movable clutch member, a gate for said spout slidable horizontally into and out of closing relation to the spout, a rod slidably carried by said support under said trough and extending longitudinally of the trough with its front end secured to said gate and its rear end connected with said lever, a spring urging said rod forwardly to move the gate to a closed position and shift the movable clutch member away from the stationary clutch member, a tooth carried by said rod, manually actuated means carried by said support and connected with said rod for shifting the rod rearwardly, a latch lever pivotally mounted and extending transversely across said rod in position to engage said tooth and secure the rod in a retracted position with the gate open and the movable clutch member in engagement with the stationary clutch member to transmit rotary motion from the drive shaft to the conveyor shaft, a solenoid carried by said support over said latch lever, a core for said solenoid connected with said latch lever for drawing the latch lever to a releasing position when the solenoid is energized, and a circuit for said solenoid including a stationary switch member and a movable switch member for engaging the stationary switch member and closing the circuit through the solenoid when a portion of the scale is moved by the weight of material delivered into the receptacle carried by the scale.

HARVEY NEILL.